United States Patent Office 3,362,859
Patented Jan. 9, 1968

3,362,859
GAS-GENERATING COMPOSITIONS
AND THEIR PREPARATION
Ernest S. Sutton, Nottingham Green, Newark, Del., Eugene J. Pacanowsky, Elkton, Md., and Calvin W. Vriesen, Brookside, Newark, Del., assignors to Thiokol Chemical Corporation, Bristol, Pa., a corporation of Delaware
No Drawing. Filed Oct. 21, 1965, Ser. No. 502,776
17 Claims. (Cl. 149—19)

This invention relates to solid fuel compositions useful for generating gas upon combustion and to methods for preparing them.

More particularly this invention concerns novel gas-generating compositions having greatly improved combustion characteristics.

The term polynitrated organic, or polynitro organic, oxidizer as used throughout this application refers to compositions having at least 3 nitrate or nitro groups covalently bound to the rest of the molecule and excludes inorganic nitrate salts such as ammonium nitrate.

The term hydroxamic acid type coolant throughout this application not only refers to coolants containing up to 6 carbon atoms having and at least one and no more than four groups of the structure:

$$-\overset{\text{O}}{\underset{\|}{\text{C}}}\text{NHOH}$$

in the molecule, but to the composition hydroxyl ammonium oxalate:

$$\text{HONH}_3\text{OC}=\text{O}$$
$$\text{HONH}_3\text{OC}=\text{O}$$

which structurally speaking is not a hydroxamic acid at all but functions as a coolant in the same fashion.

Among the many coolants contemplated as being within the scope of the above definition are the following structures:

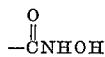
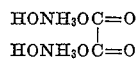

Oxamalonohydroxamic acid

Oxalohydroxamic acid amide

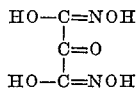
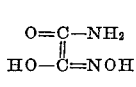

Diammonium Oxalohydroxamate

Amodiformohydroxamic acid

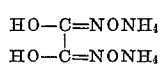
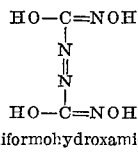

Oxalohydroxamic acid

Tri(formohydroxamyl) amine

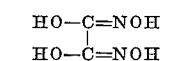
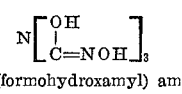

Monoammoniumoxalohydroxamate

Oxalomonohydroxamic acid

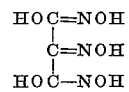

Oximidomalonohydroxamic acid as well as the aforementioned hydroxyl ammonium oxalate.

Within recent years, especially where applications in the aerospace or aeronautical fields are concerned, there has been increasing reliance upon the use of devices driven or actuated through the generation of gases. These devices commonly derive their energy from the controlled combustion of solid gas-generating compositions in the gas turbine engines. The combustion of these solid compositions to gaseous products can be used to pressurize a fluid or drive a turbine to produce mechanical or electrical energy or to start various mechanical devices. The gas-generating devices are particularly advantageous in that they are capable of producing a rather substantial amount of power (considering the relatively light weight of the fueled gas generator) compared to conventional gas or oil powered generators. Because of their high power to low weight ratio, these devices are especially suited to drive gas turbines and jet type engines for intermittent or short term use.

Recently a novel group of coolants has permitted the use of perchlorate oxidizers in gas-generating compositions. These compositions are disclosed in U.S. Patents 3,193,421 and 3,214,304. Specifically the above disclosures taught that when the energetic perchlorates heretofore unusable as oxidizers in gas-generating compositions are formulated with oxalohydroxamic acid and related compounds, a substantial decrease in flame temperature is obtained. While these perchlorate based gas-generating compositions, are highly energetic compositions they do possess three substantial disadvantages which preclude their effective use for both military and commercial applications.

One of the defects of "cooled" perchlorate based gas-generating compositions is that they release hydrogen chloride upon combustion. Hydrogen chloride is a highly corrosive substance and causes severe corrosion problems in the gas-generator apparatus. This corrosion increases "down" time of the generator and increases maintenance and replacement work to a prohibitive level. In effect, in the present state of the art, the use of perchlorate based gas-generating compositions is not practical except for "one shot" applications.

Another serious defect of the perchlorate based gas-generating compositions of the prior art is that in addition to the aforementioned hydrogen chloride, substantial quantities of water are concurrently produced during combustion. At lower levels the hydrogen chloride and water form a visible cloud of hydrochloric acid while at higher levels the water can freeze. These combustion products can compromise security in many military applications. This release of water is even greater in ammonium nitrate based gas-generating compositions. In typical formulations as much as 20–35 percent by weight of water is released during combustion, depending upon the particular formulation and the extent of combustion. A third disadvantage of these perchlorates (especially with the alkali perchlorates) based compositions of the prior art is the relatively high level of erosive particles in the exhaust gases released during combustion. Erosion is the cause of increased maintenance and operating costs during the sustained operation of gas-generating apparatuses.

Because of these problems of corrosion and erosion and the release of large quantities of water in the exhaust caused by the use of the perchlorate and ammonium nitrate compositions of the prior art, there is a real need for new and improved gas-generating compositions. Ideally these compositions would be highly energetic upon combustion, would produce substantially less water during combustion than do the nitrate and perchlorate based compositions of the prior art, and would emit relatively non-corrosive and non-erosive combustion gases.

In addition the gas-generating composition should be ignitable after prolonged storage at temperature extremes ranging from as high as 180° F. to as low as −80° F., and should be homogeneous in content and have substantial elasticity to minimize gaps or voids that cause inconsistent or uneven burning. Finally these gas-generating compositions properties should be varied widely by the optional incorporation of varying amounts of different propellant adjuvants.

Thus it is an object of this invention, among others, to prepare novel gas-generating compositions superior in several respects to compositions of the prior art.

It is a more specific object of this invention to prepare gas-generating compositions which upon combustion produce a minimal quantity of water, hydrogen chloride, and erosive and corrosive exhaust gases.

Additional objects of this invention are the preparation of stable easily ignitable, gas-generating composition which burn at relatively low flame temperatures.

Further objects will become apparent to those skilled in the art after a further perusal of this application.

In practice a novel and superior gas-generating composition is prepared by mixing, casting and curing a curable homogeneous composition composed of:

(1) an organic polynitrated or polynitro oxidizer,
(2) a combustible fuel binder,
(3) hydroxamic acid coolants with or without,
(4) propellant adjuvants.

The gas-generating composition of this invention is composed essentially of the components shown below in the relative proportions indicated.

(1) From about 20 to 55 parts by weight of a polynitrated or polynitro oxidizer defined more fully infra.

(2) From about 15 to 35 parts by weight of a combustible fuel binder. The combustible fuel binder always includes a major amount of polymeric composition(s) and a minor amount of one or more catalysts, curing agents, plasticizers and the like. The preferred binders are the polyesters, particularly the modified polyesters such as the carboxy-terminated, hydroxyterminated and isocyanate-terminated linear polyesters. Other satisfactory binders are polyester-polyurethane copolymers terminated with thiol groups. Other less favored polymers which can be used are the polycarbonates, the polyacrylates and the polyepoxides, as well as the copolymers and terpolymers of these polymers.

(3) From about 10–60 parts by weight of one or more of the novel hydroxamic acid type coolants of this invention. Substantial reduction in flame temperature is observed when more than 20% by weight of the final cured gas-generating composition is made up of one or more of the disclosed coolants of this invention. The preferred coolant in the inventive gas-generating compositions is oxalohydroxamic acid, also referred to as dihydroxyglyoxime (DHG).

(4) Up to 20 parts by weight of propellant adjuvants. As indicated earlier, the presence of propellant adjuvants, while not essential to the operability of the inventive gas-generating compositions, is preferable to achieve optimum performance. Where such an adjuvant is used, it will ordinarily comprise between about 0.25%–5% by weight of the gas-generating composition.

The above components of the gas-generating mixture are mixed to form a homogeneous composition that is then cast, or extruded, and cured by use of procedures well known in the gas-generator art so that they will burn evenly and continuously within the gas-generator. Since the final cured gas-generating composition contains at least several ingredients, it is essential for satisfactory performance that the composition be homogeneous in content. Thus throughout this disclosure and claims, the gas-generating composition referred to is understood to be one that has been formulated to be homogeneous.

(1)                OXIDIZER

As indicated earlier, the oxidizers of this invention are di- and polynitrated or polynitro organic compounds selected from the group consisting of cyclotrimethylenetrinitramine (RDX or hexahydro-1,3,5 - trinitro - 5-triazine), triaminotrinitrobenzene, cyclotetramethylenetetranitramine (HMX or 1,3,5,7-tetranitro-1,3,5,7-tetrazacyclooctane), trimethylolethenetrinitrate, nitrocellulose, diaminotrinitrobenzene (DATB).

Because of the corrosive effect of hydrogen chloride in the combustion gases, the use of perchlorates and chlorates as oxidizers is precluded.

Similarly the use of ammonium nitrate and many other nitrate oxidizers is contraindicated since these oxidizers upon combustion release up to 30% by weight of water vapor into the atmosphere. For military applications the use of these oxidizers that liberate large quantities of telltale water vapor cannot be tolerated.

In general, varying proportions of the oxidizer can be employed in the gas-generating compositions of this invention. For example, depending upon the use intended, the oxidizer can be present in the cured solid gas-generating composition in sufficient quantity so that it makes up about 20–80% by weight of the finished compositions.

Compositions containing less than 50% by weight of oxidizer have a lower burning rate and thus would be useful for gas turbine and jet aircraft starters; whereas compositions containing more than 50% of oxidizer would be useful in preparing gas-generating compositions where a higher burning rate is desirable. In all instances, the balance of the gas-generating composition will consist of 20–60 parts by weight of the inventive coolant and 15–35 parts by weight of fuel binder with up to 10% by weight of one or more propellant adjuvants if desired.

(2)              FUEL BINDER

The fuel binder referred to throughout this application refers to combustible oxygenated polymeric resins or their percursors which can be cured to the desired hardness and which are utilized as fuels for the oxidizers. The term "fuel binder" as used throughout this invention not only includes the polymeric composition which is present in a major amount but also includes a minor amount of one or more curing agents, plasticizers and catalysts used in the resin art which impart the required rigidity or body to the final useable gas-generating composition. Because the curing agent will vary according to the polymer or polymers being treated, the amount of curing agent or agents used cannot be stated with precision.

Fuel binders containing oxygen are essential, with binders containing substantial quantities of oxygen in the molecule being favored. The reason for this is that these binders supplement the oxidizer in assuring gaseous combustion products and therefore aid in the oxidation of the binder. Among the many favored oxygen containing resins which can be used are the following: The polyamides, the polyesters, the polycarbonates, the polyurethanes, the polyacrylates, and the polyepoxides, as well as these resins modified by nitration and the like or these resins copolymerized with other resins or each other.

A group of fuel binders that are especially preferred because of their superior physical and combustion characteristics, are the carboxyterminated, hydroxy-terminated and isocyanate-terminated linear polyesters having a molecular weight ranging from 500 to 15,000, preferably from 5,000 to 12,000.

Where the preferred carboxy-terminated linear polyesters are used as fuel binders, the polyester can be prepared by reacting a polycarboxylic acid with a hydroxylated, preferably polyhydroxylated, compound under reaction conditions such as temperature, pressure and catalysts described in the resin art. The reaction product is a liquid carboxy-terminated prepolymer which is admixed with other components of the composition and cured to form the final gas-generating composition.

Typical polycarboxylic acids which can be used as reactants in preparing the above described carboxy-terminated polyesters include oxalic, adipic, sebacic, maleic, fumaric, diglycolic and others, as well as mixtures of these acids. Hydroxylated reactants include, among others, the polyols such as: ethylene glycol, diethylene glycol, propylene glycol, polybutylene and polypropylene glycols, glycerols, sorbitols, castor oil, 1,2,6-hexane triol and the like, as well as mixtures of these compounds and their analogues. In the alternative any of the numerous commercially available polyesters can be used as the source of the fuel binder.

Similarly where the binder is to be a polyurethane containing polyester, the polyester can be made by reacting adipic acid with diethylene glycol. The polyester is then reacted with a diisocyanate such as 2,4-toluene diisocyanate. Alternatively the polyurethane containing polyester binder can be derived by curing commercially available polymers or their mixtures.

Whereas ordinarily the fuel binders contemplated are a single polymer, such as the favored polyesters or the less favored polyacrylamides, polyurethanes, and the like, it is frequently advantageous to prepare mixtures of these resins or the resins modified by imparting additional functional groups to the resinous molecule. For example, a modified polyurethane resin can be prepared by reacting a polyurethane with 1,2-ethane dithiol to result in a prepolymer which can be cured by the polysulfide type of cure. Another approach to the same type of prepolymer is to react a carboxy-terminated polyester with the 1,2-ethane dithiol.

In all instances, the resin used as a fuel binder is cured according to the curing techniques well known to the particular resin art using the usual polymerization catalysts, curing agents or accelerators commonly used. For example, the favored carboxyl containing polyesters are cured at temperatures ranging from 80–180° F. and above, using the usual curing agents such as polyimines, polyepoxides and the like. To obtain the maximum energy available in the system the use of nitrated plasticizers is preferred. This includes nitrate esters of aliphatic hydroxy compounds such as diethylene glycol dinitrate (DEGDN), triethylene glycol dinitrate, nitroglycerin and the like. Similarly the isocyanate terminated polyesters can be cured at temperatures varying between room temperature and 200° F. and even higher when treated with hydroxylated curing agents such as polyols, while the hydroxyl terminated polyesters are cured with di- or triisocyanato compounds at temperatures ranging from 75° F. to 180° F. Since the methods of preparing or modifying the various resins used as binders are not the novel feature of this invention, no attempt is made to describe these manipulations in detail. It shall suffice to say that the preparative methods and curing techniques are well known procedures described in the technical literature, particularly in the "Plastics Application Series" published by Reinhold Publishing Corporation, New York City, N.Y.

(3) COOLANTS

The coolants utilized in the inventive gas-generating compositions are disclosed in U.S. Patents Nos. 3,193,421 and 3,214,304 among other places. The preferred coolant is oxalohydroxamic acid. Other favored coolants are oxalohydroxamines acid amide, monoammonium oxalohydroxamate, oxalomonohydroxamic acid, and hydroxylammonium oxalate.

As indicated supra, the unexpected discovery that certain hydroxamic acids and their derivatives lower the flame temperature had permitted the conversion of perchlorate-based propellant compositions to gas-generating compositions. More specifically, the inclusion of these novel coolant compositions into ammonium perchlorate based propellant compositions had created low temperature burning gas-generating compositions. While the use of these coolants in perchlorate-based propellant compositions reduced the flame temperature up to 50%, the combustion gases containing HCl were highly corrosive and erosive and were laden with water. To overcome these disabilities the inventive nitrate oxidizers have been substituted for the perchlorates in the system. While all of the named coolants function satisfactorily as coolants, one coolant, oxalohydroxamic acid, gives especially superior performance, particularly in sustaining combustion and in decomposing almost entirely to gaseous combustion products. For this reason it is the preferred coolant when used with the nitrate or nitro oxidizer of this invention. Since it is the hydroxamic acid moiety which is apparently the active coolant, the described salts such as the ammonium salt or substituted ammonium salts can often be used as coolants as advantageously as the parent compounds. These salts can be prepared in the usual manner by reacting one or two moles of ammonia of the substituted ammonium base with the corresponding hydroxamic acid.

(4) PROPELLANT ADJUVANTS

In addition to the curing agents, solvent, polymerization and vulcanization catalysts and the like which are described separately and included within the fuel binder content of the inventive gas-generating compositions, certain conditioning or modifying agents can often be advantageously added to gas-generating compositions to alter or improve their physical and combustion characteristics. For convenience, these substances are herein generically referred to as propellant adjuvants and they can be present in the finished gas-generating composition in amounts from up to about 10 parts by weight down to 0 part by weight of the final gas-generating composition.

More commonly, however, the adjuvants comprise from about 0.25 part by weight or even less up to about 5 parts by weight of the gas-generating composition. Among the many propellant adjuvants which can be used are included the following typical materials: Darkening agents such as carbon black or lamp black, ballistic agents such as ferrocene, hygroscopicity inhibitors such as magnesium oxide, and high temperature stabilizers such as 2,4-diamino-6-phenyls-triazine (DAPT). The combustion catalysts are of diverse structure but generally are compounds containing oxygen. These catalysts can be inorganic or organic compounds. They include, among many others, oxides, such as magnesium, iron, copper, titanium, calcium, molybdenum, and vanadium oxides and the like. Especially effective as combustion catalysts are the chromates and dichromates, generally with ammonium dichromate being a preferred catalyst. Other satisfactory combustion catalysts include barbituric acid, sodium barbiturate, metallo organics such as iron and cobalt dicyclopentadienyl, and ferric and cobalt acetyl acetonate and certain dyes including copper phthalocyanine.

(5) PREFERRED GAS-GENERATING COMPOSITIONS

As indicated supra, for various reasons, certain individual components of the gas-generating compositions are preferred over others. Thus the preferred gas-generating compositions of this invention are made up of:
(1) from about 20–60 parts by weight of RDX oxidizer,
(2) from about 15–35 parts by weight of a carboxy-terminate linear polyester fuel binder having a molecular weight between 5–12,000,
(3) from about 20–60 parts by weight of oxalohydroxamic acid,
(4) from about 0–10 parts by weight of propellant adjuvants.

(6) COMPOUNDING THE INGREDIENTS

In preparing the solid gas-generating composition the following procedure among many others can be used.

Preferably the liquid or semi-liquid components are combined and admixed to homogeneous mixture and the solid components are then blended in.

In practice the polyester fuel binder, curing agent, and liquid plasticizer are admixed and the solid components such as oxalohydroxamic acid and the oxidizer are incorporated into the mixture.

Also added at this time are 0–10 parts by weight of any propellant adjuvants that are required. During these additions efficient mixing is maintained until a homogeneous mixture results. The total mixing time for a uniform mixture varys according to the batch size but ordinarily at least 30 minutes of mixing is required with 90 minutes or more representing the extreme time. Finally the uniformly blended uncured gas-generating composition is cast into a gas-generator engine and the composition is cured at the required temperature until the desired state of hardness is obtained. The curing times and temperatures are dependent upon the particular resin used as a binder and the batch size among other things, and thus cannot be stated with precision. However, the following ranges of time and temperature are typical for curing a gas-generating composition containing the fuel binders described below.

| Binder | Range of Curing Temperatures, °F. | Range of Curing Time, hours |
|---|---|---|
| Carboxyl-terminated Polyester | 80–180 | 6–50 |
| Hydroxyl-terminated Polyester | 80–200 | 6–70 |
| Isocyanate-terminated Polyester | 120–200 | 6–70 |

In order to illustrate the preparation and use of the novel gas-generating compositions of this invention, the following embodiments are submitted.

*Example 1.—Preparation of RDX based gas-generating compositions using oxalohydroxamic acid as coolant*

The combustible fuel binder used in this embodiment is a carboxy terminated polyester resin prepared by condensing adipic acid with diethylene glycol. The resulting polyester has an acid number of 56 and a viscosity of 300 poises at 25° C. This binder material contains 37.5% oxygen and is sold by Minnesota Mining and Manufacturing Company as HX–730.

To a suitable blending vessel fitted with a vertical planetary mixer are added 16.44 parts by weight of the above polyester, 3.01 parts by weight of 1,1′-(sulfonylethylene)-bis-2-methyl aziridine (ZC-466) curing agent, and 10.00 parts by weight of diethylene glycol dinitrate plasticizer. These components are mixed for 10 minutes, then 35 parts by weight of oxalohydroxamic acid coolant and 35 parts by weight of RDX are added and the resultant blend mixed for an additional 30 minutes. The density of the uncured composition is 0.0575 lb./in.$^3$. At the end of this time, duplicate samples of the above composition are cast in a strand mold and cured at 135° F. for 60 hours. The strands of cured gas-generating composition are burned in a Crawford Strand Burner and the combustion characteristics measured at 60° F. The burning rate at 1000 p.s.i.a. is determined to be 0.195 in./second. Another sample of the propellant was cured in a test motor and the burning rate thereof was determined to be 0.128 in./second at 583 p.s.i.a. The exhaust of this composition contained only 9.1 percent water. The exhaust of comparable composition contained only 9.1 percent water. The exhaust of comparable compositions containing ammonium perchlorate and ammonium nitrate oxidizer contain the following quantities of water and hydrogen chloride.

| Components | Weight Percent | | | |
|---|---|---|---|---|
| | Composition 1 | Composition 2 | Composition 3 | Composition 4 |
| HX 730 | 25 | 25 | 25 | 25 |
| Ammonium Perchlorate | 40 | | 75 | |
| Ammonium Nitrate | | 40 | | 75 |
| Oxalohydroxamic Acid | 35 | 35 | | |
| Exhaust Content: | | | | |
| H$_2$O | 13 | 21 | 20 | 27 |
| HCl | 11 | | 23 | |

*Example 2.—Preparation of another RDX based gas-generating composition using different binders and curing agents*

In this example substantially the same formulation is used as described in Example 1, except that another more highly oxygenated carboxy terminated polyester is used, namely, a binder sold by the Witco Chemical Company of New York as their product F–17–80. This binder has an acid number of 72.3, a molecular weight of 1550, a viscosity of 400 poises at 25° C., and contains 42.5% oxygen by weight.

To a suitable blending vessel fitted with a vertical planetary mixer are added 17.20 parts by weight of the above F–17–80 polyester, 2.20 parts by weight of ZC–466 curing agent, and 0.60 part by weight of a commercially obtained epoxy resin having an E.E.W. of 180–270. The components are mixed vigorously for 10 minutes and 10 parts by weight of diethylene glycol dinitrate plasticizer are blended therewith. At the end of this time 35 parts by weight of oxalohydroxamic acid and 35 parts by weight of RDX are added and the mixture is stirred for an additional 30 minutes. A cured sample is prepared and tested as described in Example 1. Density is 0.0575 lb./in.$^3$, and theoretical water is 8.8% by weight. Burning rate exponent is 0.466 and burning rate of strands at 1000 p.s.i.a. was 0.165.

A substantial increase in exhaust water is obtained when either ammonium perchlorate or ammonium nitrate is substituted for RDX on a weight basis. Neither corrosion nor erosion with the RDX based composition is substantial.

*Examples 3–6.—Preparation of other gas-generating compositions varying oxalohydroxamic acid coolant and oxidizer*

In these examples, formulations are prepared substantially as described in Example 1. The binder (including the same curing agents), oxidizer, and combustion catalysts and techniques are the same as previously described. The formulations are as follows:

*Example 3*

| Components: | Parts by wt. |
|---|---|
| DEGDN plasticizer | 11.50 |
| RDX oxidizer | 35.00 |
| Oxalohydroxamic acid | 35.00 |
| Polyester fuel binder of Example 1 | 16.25 |
| Epoxy resin ERL–0510 | 0.48 |
| ZC–466 | 1.77 |

The formulation was cured for 72 hours at 135° F. and had an initial density of 0.057 lb./in.$^3$, a burning rate at 1000 p.s.i.a. of 0.167 in./sec., and a burning rate exponent of 0.40. Theoretical water content is 8.8%, compared to 13 percent water for a comparable formulation using ammonium perchlorate as oxidizer, and to 21 percent water for a comparable composition in which ammonium nitrate is used as oxidizer.

*Example 4*

| Components: | Parts by wt. |
|---|---|
| DEGDN plasticizer | 15.00 |
| Oxalohydroxamic acid | 50.00 |
| ZC–466 | 1.90 |
| ERL–0510 | 0.33 |
| F–17–80 polyester fuel binder of Example 2 | 12.57 |
| Diaminotrinitrobenzene oxidizer | 20.00 |

The formulation was cured for 72 hours at 135° F. and had an initial density of 0.058 lb./in.$^3$, a strand burning rate at 1000 p.s.i.a. of 0.178 in./sec., and a burning rate exponent of 0.40. The water content of the exhaust is 11.5 percent. Exhausts of comparable ammonium perchlorate and ammonium nitrate based formulations contain the following amounts of water and hydrogen chloride.

| Components | Weight Percent | |
|---|---|---|
| | Composition 1 | Composition 2 |
| DHG | 50 | 50 |
| F-17-80 | 25 | 25 |
| Ammonium Perchlorate | 25 | |
| Ammonium Nitrate | | 25 |
| Exhaust Content: | | |
| $H_2O$ | 16 | 32 |
| HCl | 8 | |

*Example 5*

Components: Parts by wt.
- Oxalohydroxamic acid _____ 49.20
- DEGDN _____ 15.00
- ZC-466 _____ 1.81
- ERL-0510 _____ 0.53
- F-17-80 _____ 12.66
- DATB _____ 20.00
- $Fe_2O_3$ _____ 0.80

The formulation was cured for 72 hours at 135° F., and had an initial density of 0.058, a burning rate at 1000 p.s.i.a. of 0.183, and a burning rate exponent of 0.424. The water content of the exhaust is 11.7 percent. Exhausts of comparable ammonium perchlorate and ammonium nitrate formulations are shown under Example 4.

*Example 6*

Components: Parts by wt.
- Oxalohydroxamic acid _____ 42.14
- DEGDN (oxidizer-plasticizer) _____ 17.00
- ZC-466 _____ 2.15
- ERL-0510 _____ 0.71
- F-17-80 _____ 17.00
- DATB _____ 20.00
- DAPT _____ 1.00

The formulation was cured for 68 hours at 135° F. and had an initial density of 0.057 lb./in.³, a burning rate at 1000 p.s.i.a. of 0.192, and a burning rate exponent of 0.35. The water content of the exhaust is 11.7 percent. Exhausts of perchlorate and ammonium nitrate based formulations contain the following amounts of water and hydrogen chloride.

| Components | Weight Percent | |
|---|---|---|
| | Composition 1 | Composition 2 |
| DHG | 42 | 42 |
| F-17-80 | 25 | 25 |
| Ammonium Perchlorate | 33 | |
| Ammonium Nitrate | | 33 |
| Exhaust Content: | | |
| $H_2O$ | 15 | 29 |
| HCl | 11 | |

This novel gas-generating composition of this invention is more advantageous in several respects than those of the prior art. For example, because of the absence of chlorine in the oxidizer no corrosion by HCl in the combustion gases is encountered. This is a substantial advantage over perchlorate based gas-generating compositions, particularly in continuous operation. Less corrosion results in more economical operation, less maintenance and less down time.

Another advantage of the inventive gas-generating compositions, especially for military applications, is the substantial decrease in water produced during combustion. The prior art compositions containing ammonium nitrate as oxidizer produced 200 to 300% more water on the average than do applicants' compositions. As indicated earlier, in military operations the production of considerable quantities of water vapor compromises security and is undesirable.

A further, not inconsiderable advantage of the novel compositions compared to those of the prior art is the relatively small proportion of erosive particles produced during combustion. The prior art perchlorate based compositions produce substantially more erosive particles during combustion. As is the case with corrosion, less erosion makes for longer term low cost operation.

As the various illustrative examples and specification indicate, numerous modifications and changes can be made in the reactants and process conditions without deviating from the inventive concept. The metes and bounds of this invention can best be seen by the claims which follow.

What is claimed is:

1. A gas-generating composition composed essentially of the following components in the relative proportions given below:
    (a) from about 15 to 50 parts by weight of an organic polynitrated oxidizer,
    (b) from about 15 to 35 parts by weight of a combustible polyester fuel binder,
    (c) from about 30-75 parts by weight of a hydroxamic acid type coolant,
    (d) up to about 10 parts by weight of propellant adjuvants.

2. A gas-generating composition composed essentially of the following components in the relative proportions given below:
    (a) from about 15 to 50 parts by weight of a polynitrated organic oxidizer selected from the group consisting of cyclotrimethylenetrinitramine, cyclotetramethylenetetranitramine, nitrocellulose, triaminotrinitrobenzene, trimethylolethenetrinitrate and diaminotrinitrobenzene,
    (b) from about 15 to 35 parts by weight of a combustible polyester fuel binder selected from the group of carboxyl containing, hydroxyl containing and isocyanate containing polyesters,
    (c) from about 30-75 parts by weight of a hydroxamic acid type coolant selected from the group consisting of oxalohydroxamic acid, oxalohydroxamic acid amide, monoammonium oxalohydroxamate, oxalomonohydroxamic acid and hydroxylammonium oxalate,
    (d) up to 10 parts by weight of a propellant adjuvant.

3. The gas-generating composition of claim 2 wherein the polynitro organic oxidizer is cyclotrimethylenetrinitramine.

4. The gas-generating composition of claim 2 wherein the polynitro organic oxidizer is cyclotetramethylenetetranitramine.

5. The gas-generating composition of claim 2 wherein the polynitrated organic oxidizer in nitrocellulose.

6. The gas-generating composition of claim 2 wherein
    (a) the oxidizer is cyclotetramethylenetetranitramine,
    (b) the combustible polyester fuel binder is a carboxyl terminated linear polyester,
    (c) the coolant is oxalohydroxamic acid,
    (d) the propellant adjuvants are $F_2O_3$ and 2,4-diamino-6-phenyl-5-triazine.

7. The gas-generating composition of claim 2 wherein
    (a) the oxidizer is nitrocellulose,
    (b) the combustible polyester fuel binder is a carboxyl terminated linear polyester,
    (c) the coolant is oxalohydroxamic acid,
    (d) the propellant adjuvants are $F_2O_3$ and 2,4-diamino-6-phenyl-5-triazine.

8. The gas-generating composition of claim 7 wherein the oxidizer is triaminotrinitrobenzene.

9. The gas-generating composition of claim 7 wherein the oxidizer is diaminotrinitrobenzene.

10. The gas-generating composition of claim 7 wherein the oxidizer is trimethylolethenetrinitrate.

11. The method of reducing the water content of the combustion gases of gas-generating compositions containing major amounts of oxidizer selected from the group consisting of perchlorates and ammonium nitrate, combustible fuel binder and optional coolants and propellant adjuvants, which comprises replacing said oxidizer with a polynitrated oxidizer selected from the group consisting of cyclotrimethylenetrinitramine, cyclotetramethylenetetranitramine, nitrocellulose, triaminotrinitrobenzene, trimethylolethenetrinitrate and diaminotrinitrobenzene.

12. The method of claim 11 wherein the polynitrated oxidizer of cyclotrimethylenetrinitramine.

13. The method of claim 11 wherein the polynitrated oxidizer is cyclotetramethylenetetranitramine.

14. The method of claim 11 wherein the polynitrated oxidizer is nitrocellulose.

15. The method of claim 11 wherein the polynitrated oxidizer is triaminotrinitrobenzene.

16. The method of claim 11 wherein the polynitrated oxidizer is trimethylolethenetrinitrate.

17. The method of claim 11 wherein the polynitrated oxidizer is diaminotrinitrobenzene.

References Cited
UNITED STATES PATENTS

| | | | |
|---|---|---|---|
| 3,073,730 | 1/1963 | Doe et al. | 149—19 |
| 3,193,421 | 7/1965 | Sutton | 149—19 |
| 3,214,304 | 10/1965 | Vriesen | 149—19 |

BENJAMIN R. PADGETT, *Primary Examiner.*